United States Patent [19]

Hillstead

[11] Patent Number: 5,054,821
[45] Date of Patent: Oct. 8, 1991

[54] STERILE SLEEVE/CONNECTOR ASSEMBLY

[75] Inventor: Richard A. Hillstead, Miami, Fla.

[73] Assignee: Cordis Corporation, Miami Lakes, Fla.

[21] Appl. No.: 464,554

[22] Filed: Jan. 12, 1990

Related U.S. Application Data

[60] Continuation of Ser. No. 295,680, Jan. 11, 1989, abandoned, which is a division of Ser. No. 163,746, Mar. 3, 1988, Pat. No. 4,821,398.

[51] Int. Cl.⁵ ............................................. F16L 39/00
[52] U.S. Cl. ................................. 285/321; 285/244; 29/235; 29/450
[58] Field of Search ............... 285/260, 244, 238, 239, 285/321, 39; 29/235, 450, 453; 604/163, 171, 283, 955; 128/303 A

[56] References Cited

U.S. PATENT DOCUMENTS

| | | | |
|---|---|---|---|
| 3,099,015 | 7/1963 | Renehan | 285/260 |
| 3,103,016 | 9/1963 | Perlman | 285/260 |
| 3,119,174 | 1/1964 | Wokeck | 29/235 |
| 3,140,495 | 7/1964 | Gottwik | 285/260 X |
| 3,289,286 | 12/1966 | Belanger | 29/235 |
| 3,319,325 | 5/1967 | Nessamar et al. | 29/235 |
| 3,466,067 | 9/1969 | Orain | 285/244 |
| 3,604,096 | 9/1971 | Shiroma | 29/235 |
| 3,605,239 | 9/1971 | Eschholz | 29/235 |
| 3,777,358 | 12/1973 | Matievich et al. | 29/450 |
| 3,834,543 | 9/1974 | Dreves | 210/232 |
| 3,989,049 | 11/1976 | Yoon | 128/303 A |
| 4,226,239 | 10/1980 | Polk et al. | 128/303 A |
| 4,257,419 | 3/1981 | Göltner et al. | 128/303 A |
| 4,327,735 | 5/1982 | Hampson | 128/348 |
| 4,374,523 | 2/1983 | Yoon | 128/303 A |
| 4,765,049 | 8/1988 | Lundquist | 29/235 |
| 4,807,343 | 2/1989 | Wadsworth | 29/235 |
| 4,821,398 | 4/1989 | Hillstead | 285/244 |

FOREIGN PATENT DOCUMENTS 814357 6/1959 United Kingdom .

OTHER PUBLICATIONS

Cordis Angio Catalog, Jan. 1988, pp. 1-6, 101 and 102.

Primary Examiner—Dave W. Arola
Attorney, Agent, or Firm—Henry W. Collins; Thomas R. Vigil

[57] ABSTRACT

The sterile sleeve/connector assembly includes a joint formed between a sterile sleeve and a connector. The sleeve is made of a tube of thin flexible material, the connector includes a hub having an annular groove therein, and the joint includes an O-ring which is positioned within a bight of an inwardly inverted end portion of the sleeve and within the groove of the connector hub. The apparatus used in forming the assembly comprises a barrel member having a lumen, a distal end and a proximal end. The barrel member has a diameter approximately equal to a diameter of the hub the connector and less than the diameter of the sleeve. The method for using the apparatus comprises the steps of (a) pushing the O-ring onto an outer surface of the barrel member at the distal end of the barrel member; (b) sliding a sleeve over the barrel member; (c) inverting an end portion of the sleeve into the distal end of the lumen of the barrel member; (d) sliding the hub of the connector into the inverted end portion of the sleeve at the distal end of the lumen; (e) forcing the O-ring off the distal end of the barrel member, into a bight of the inverted end portion of the sleeve and into the annular groove in the hub of the connector; and (f) removing the connector from within the barrel member and pulling on the connector until the entire sleeve is removed from over the barrel member.

2 Claims, 2 Drawing Sheets

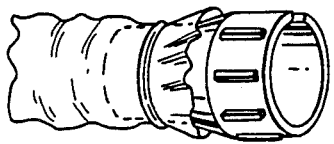
FIG. 1 - PRIOR ART
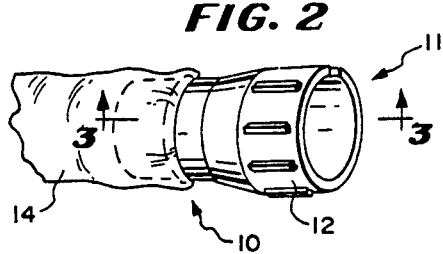
FIG. 2
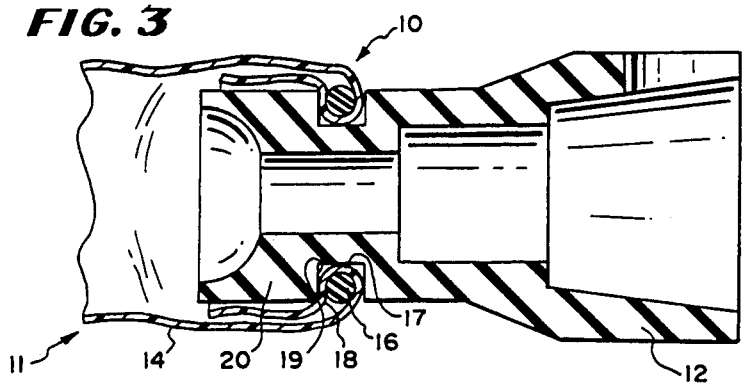
FIG. 3
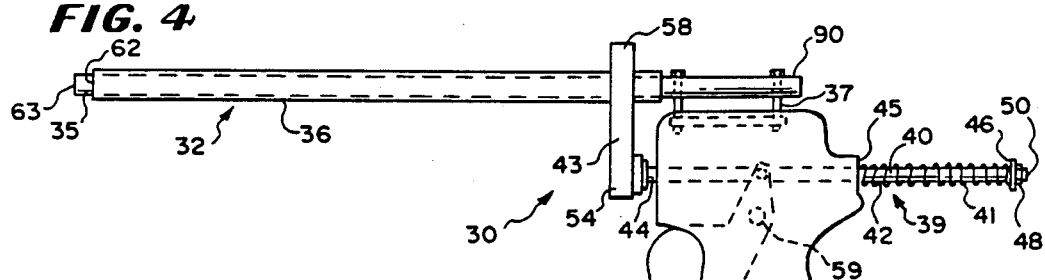
FIG. 4
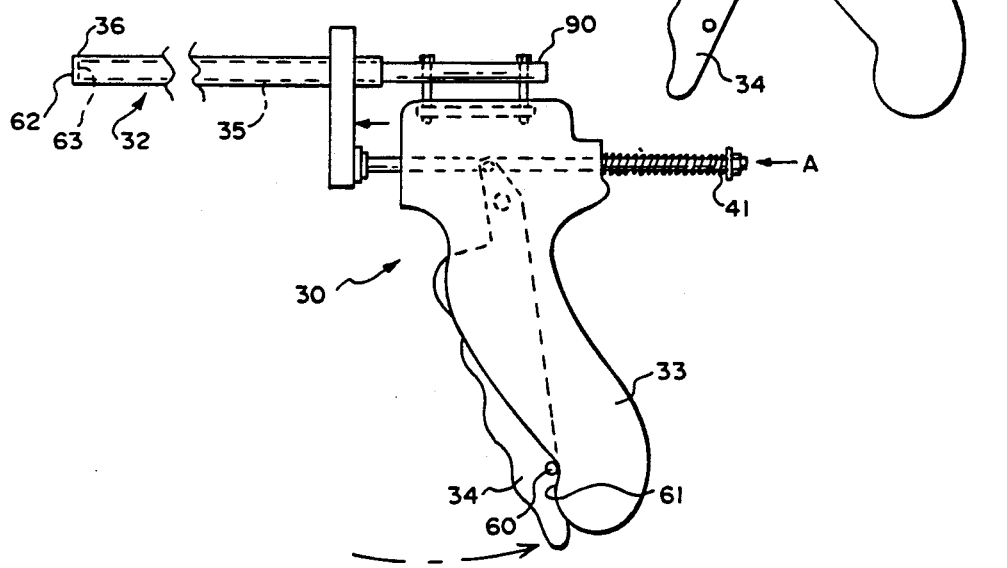
FIG. 5

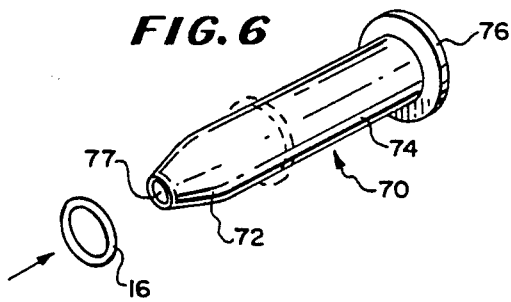
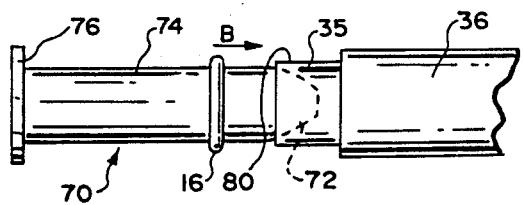
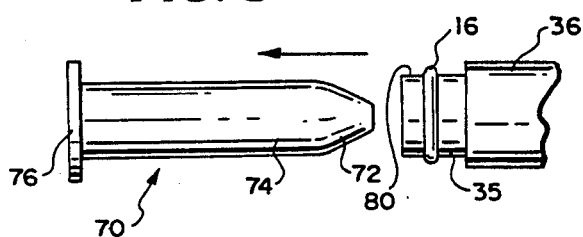
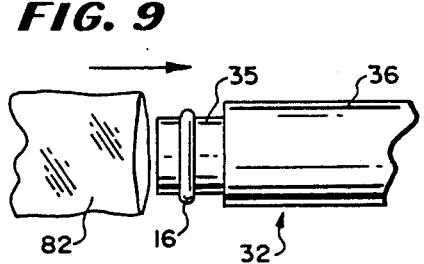
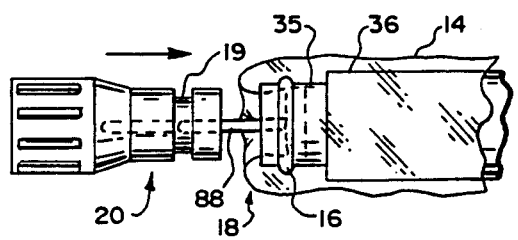
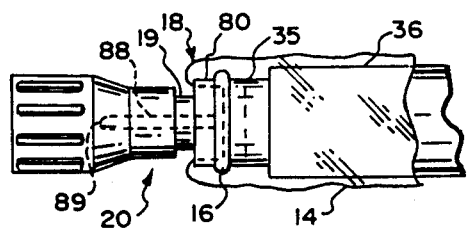
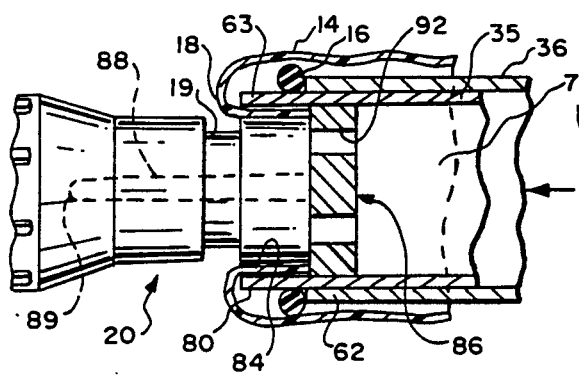
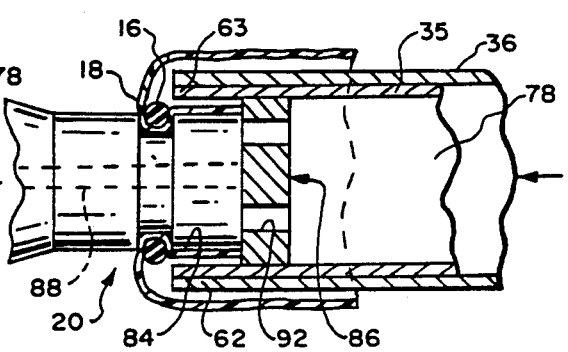

STERILE SLEEVE/CONNECTOR ASSEMBLY

This is a continuation of application Ser. No. 295,680, filed Jan. 11, 1989, now abandoned, which is a division of Ser. No. 163,746, filed Mar. 3, 1988, now U.S. Pat. No. 4,821,398.

BACKGROUND OF THE INVENTION

1. Field of the Invention

The present invention relates to a method and apparatus for attaching a sterile sleeve to a connector, such as a distal fitting for the sterile sleeve, and the assembly formed thereby. More specifically, the method and apparatus enable a sterile sleeve to be attached to a connector in such a manner that a loose end of the sleeve is tucked within the body of the sleeve and over a portion of the body of the connector, as will be described in greater detail hereinafter.

2. Description of the Prior Art

Heretofore various methods and apparatus have been proposed for forming a joint or sealed coupling between a sterile sleeve and a connector therefor. All such methods and apparatus form the joint or coupling by placing an end section of a sterile sleeve over a connector body and then feeding an O-ring over the end of the, sterile sleeve and/or the connector body for securing the sterile sleeve to the connector body when the O-ring placed over the sleeve and connector is received within an annular groove provided on the connector body.

An example of such sterile sleeve/connector assembly is disclosed in the Hampson U.S. Pat. No. 4,327,735 the disclosure of which is incorporated herein by reference. As disclosed in this patent, a sleeve/introducer assembly is fitted over a medical catheter for the purpose of protecting the catheter within the sleeve from contaminants thereby to maintain the catheter in a sterile condition.

Applicant's assignee, Cordis Corporation of Miami Lakes, Florida, sells such sleeve/introducer assemblies under the name or mark "Steri-Sleeve" which is a contraction of the term "Sterile Sleeve" used herein.

Such a "Steri-Sleeve" is disclosed on page 102 of the January 1988 Cordis Corporation Catalog, the disclosure of which is incorporated herein by reference.

Such joints or couplings formed by prior art methods and apparatus have left a straggling, loose end of the sterile sleeve extending from the O-ring over the connector body to which the sterile sleeve is joined Such a straggling loose end makes separation of the joint simple All a user need do is gently pull on the sleeve, against. the O-ring, and remove the sleeve from entrapment beneath the O-ring to cause a separation of the sleeve from the connector.

By utilization of the apparatus and method of the present invention in forming the joint in a sterile sleeve/connector assembly of the present invention, the O-ring is received within or encased within an inwardly turned or inverted looped end portion of the sterile sleeve, with the previously straggling, loose end portion of the sterile sleeve now extending inwardly into the lumen of the sterile sleeve with the O-ring positioned to entrap the inwardly extending end portion of the sleeve within an O-ring receiving annular groove provided on a connector, with the remainder of the sterile sleeve looping outwardly and back over the entrapped end portion of the sterile sleeve and extending over the connector. Such joint or coupling formed by the method and apparatus of the present invention provides a joint which is much more difficult to separate and provides a neat termination of the sleeve about the O-ring and over the connector in the manner described so that there is no loose straggling end, making the external surface of the joint more regular.

As will be described in greater detail hereinafter, it is believed that the joint in a sterile sleeve/connector assembly of the present invention can only be accomplished by use of the particular method and apparatus disclosed herein.

SUMMARY OF THE INVENTION

According to the present invention there is provided a sterile sleeve/connector assembly adapted to be mounted on a medical catheter and comprising a tubular connector including a hub, a sterile sleeve for protecting the catheter received therein from contaminants thereby to maintain the catheter in a sterile condition and a joint formed between an end portion of said sterile sleeve and said hub of said connector, said sterile sleeve being made of a tube of thin flexible material, said hub having an external annular groove therein, and said joint including an elastic O-ring which is positioned within a bight formed between inner and outer sleeve rings of an inwardly inverted end portion of said sleeve, against the inner sleeve ring of said sleeve, and within and against the bottom of said groove in said hub.

BRIEF DESCRIPTION OF THE DRAWINGS

FIG. 1 is a perspective view of a prior art joint or coupling between a sterile sleeve and a connector in a sterile sleeve/connector assembly formed by known methods.

FIG. 2 is a perspective view of the joint or coupling of the present invention between a sterile sleeve and a connector in a sterile sleeve/connector assembly formed by the method and apparatus of the present invention.

FIG. 3 is a longitudinal sectional view through the joint or coupling in the sterile sleeve/connector assembly of the present invention formed by the method and apparatus of the present invention and is taken along line 3—3 of FIG. 2.

FIG. 4 is a side plan view of one embodiment of an apparatus for carrying out the method for forming the joint or coupling of the present invention, and shows the apparatus in an at-rest position.

FIG. 5 is a side plan view of the apparatus shown in FIG. 4 but shown here in an actuated position.

FIG. 6 is a perspective view of a bullet-shaped plug and a flexible elastomeric O-ring which can be used with the apparatus shown in FIGS. 4 and 5 for forming the joint or coupling of the present invention.

FIG. 7 is a side plan view of the plug shown in FIG. 6 with an O-ring positioned thereon, and shows a distal end of the plug inserted into a distal end of an inner barrel member of the apparatus shown in FIGS. 4 and 5.

FIG. 8 is a side plan view of the bullet-shaped plug similar to the view shown in FIG. 2 and shows the plug moved axially away from the inner barrel member after the O-ring has been moved to a position on a distal end portion of the inner barrel member of the apparatus shown in FIGS. 4 and 5.

FIG. 9 is a side plan view of the distal end portion of the inner barrel member shown in FIGS. 7 and 8 and shows a sterile sleeve positioned over the distal end portion of the inner barrel member of the apparatus shown in FIGS. 4 and 5.

FIG. 10 is a side plan view of the distal end portion of the inner barrel member of the apparatus shown in FIGS. 4 and 5 and of a connector used in forming the sterile sleeve/connector assembly of the present invention positioned for insertion into the distal end portion of th inner barrel member after the sterile sleeve has been slid over the inner and outer barrel members of the apparatus shown in FIGS. 4 and 5 and an end portion of the sleeve has been inwardly inverted into the distal end portion of the inner barrel member.

FIG. 11 is a side plan view of the connector positioned within the distal end portion of the inner barrel member of the apparatus shown in FIG. 10 and the sleeve end portion shown in FIG. 10.

FIG. 12 is a longitudinal sectional view through the distal end portion of the inner and outer barrel members shown in FIG. 11, shows a depth regulator fixed within a distal end of a lumen of the inner barrel member and shows a connector within the lumen of the inner barrel member and abutting the depth regulator.

FIG. 13 is a longitudinal sectional view through the distal end portion of the barrel members similar to the view shown in FIG. 12 but after the distal end portion of the outer barrel member has been positioned over the distal end portion of the inner barrel member to move the O-ring into a bight of the inwardly inverted end portion of the sleeve and into a groove of the connector hub.

DESCRIPTION OF THE PREFERRED EMBODIMENT

Referring now to the drawings in greater detail, there is illustrated in FIG. 1 a perspective view of a prior art joint or coupling formed between a sterile sleeve and a connector, such as a distal fitting for the sterile sleeve, by the use of an O-ring.

As illustrated, the joint or coupling formed by known methods and apparatus is formed in a manner wherein an end portion of a sterile sleeve is fitted over a hub of a connector body, and then an O-ring, which has a diameter less than the diameter of the hub of the connector body, is slid over the sleeve and connector body to position where the O-ring is received within an annular groove provided in the outer surface of the hub of the connector body for receiving the O-ring therein for securing the sterile sleeve to the connector.

Such a prior art sleeve and connector body is disclosed in the Hampson U.S. Pat. No. 4,327,735 and on page 102 of the Cordis Corporation January 1988 catalog. A catheter (not shown) is received in the sleeve and maintained in a sterile condition by the sleeve.

As shown, in the prior art joint or coupling, an end portion of the sterile sleeve extends distally of the O-ring over the connector body, leaving a loose, straggling, irregular end portion of the sterile sleeve exposed. The leaving of such an exposed, irregular loose end portion allows the joint or coupling to be easily disrupted, such as by pulling on the elongate body portion of the sterile sleeve to cause the O-ring to roll within the groove until the end of the sterile sleeve escapes entrapment from under the O-ring. Such irregular loose end portion is avoided in the joint or coupling in a sterile sleeve/connector assembly constructed with the method and apparatus of the present invention as will be described in greater detail hereinafter.

In FIG. 2, a joint or coupling 10 in a sterile sleeve/connector assembly 11 constructed according to the teachings of the present invention is formed between a connector 12 and a sterile sleeve 14 in such a manner that the joint 10 has a smooth external surface and no straggling, irregular loose end portion of the sleeve 14 exposed.

In FIG. 3, there is shown a longitudinal sectional view through the joint or coupling 10 in a sterile sleeve/connector assembly 11 constructed according to the method of and with the apparatus of the present invention.

The joint 10 includes an O-ring 16 within a bight portion 17 of an inwardly inverted, U-in-cross-section end portion 18 of the sleeve 14, the O-ring 16 and the bight portion 17 being received in an annular groove 19 formed in a hub 20 of the connector 12. In this way, the end portion 18 of the sleeve 14 is coupled or secured to the connector 12 by the tight fit of the O-ring 16 in the groove 19.

With the joint 10 formed in this manner, a greater amount of tension or pulling force must be applied to the sleeve 14 to disengage the sleeve 14 from the connector 12.

In FIG. 4, there is shown one embodiment of an apparatus 30 for practicing the method of the present invention to construct the joint or coupling 10 of the present invention. The apparatus 30 is shown in FIG. 4 in an at-rest position and has a pistol-like shape including a barrel portion 32, a handle portion 33 and a trigger 34.

The barrel portion 32 of the apparatus 30 includes an inner barrel member 35 and an outer barrel member 36, with the inner barrel member 35 being attached to the handle portion 33 in a fixed position by a bracket 37. The outer barrel member 36 is slidably received on and over the inner barrel member 35 and is spring biased against the handle portion 33 by a biasing assembly 39. The biasing assembly 39 includes a rod 40 which extends through the handle portion 33, a spring 41 received around a proximal end portion 42 of the rod 40 and a bracket 43 connected to the outer barrel member 36 and a distal end 44 of the rod 40.

The spring 41 is slightly compressed between a rear wall 45 of the handle portion 33 and a stop 46, in the form of a washer 46 fixed on the rod 40 by a nut 48 which may be threadedly received on a smaller-in-diameter threaded proximal end 50 of the rod 40. The distal end 44 of the rod 40 is fixed to a lower end 54 of the bracket 43. An upper end 58 of the bracket 43 has a bore (not shown) in which the outer barrel member 36 is fixed. The trigger 34 is pivotably connected to the handle portion 33 for pivotal movement about a pivot axis 59. An upper end of the trigger 34 is also pivotably connected to the rod 40, as shown in phantom, such that squeezing of the trigger 34 causes movement of the rod 40, as shown by arrow A in FIG. 5, from a proximal position to a distal position against, and compressing, the spring 41 to move the outer barrel member 36 forwardly over the inner barrel member 35 a predetermined distance as determined by engagement of a pin or detent 60 extending laterally outwardly from the trigger 34 with a notch 61 in the handle portion 33. This predetermined distance of relative movement between the barrel members 35 and 36 is such that a distal end 62 of the outer barrel member 36 is moved to a position covering or extending slightly outwardly of a distal end 63 of the inner barrel member 35 (FIG. 5).

FIG. 5 shows the relative movement between the outer barrel member 36 and the inner barrel member 35 when the trigger 34 is squeezed In this position, the outer barrel member 36 is shown with its distal end 62 extending slightly past the distal end 63 of the inner barrel member 35.

Upon release of the trigger 34, the rod 40 is biased by the spring 41 to the state shown in FIG. 4.

The use of the apparatus 30 will be described in greater detail in connection with the description of FIGS. 8-13, which illustrate the steps of the method of the present invention, utilizing the apparatus 30 of the present invention, to form the joint 10 of the present invention between the sterile sleeve 14 and the connector 12 therefor.

Also it is to be understood that a more sophisticated pneumatic, electric or hydraulic apparatus can be used for causing relative movement between the barrel members 35 and 36. It is contemplated that the best mode for carrying out the teachings of the present invention will include a power operated apparatus for moving one barrel member relative to the other after the sleeve is properly positioned over the barrel members 35 and 36 and suction is first applied the inner barrel member 35 to pull the end portion 18 of the sleeve 14 into the lumen 78 of the inner barrel member 35.

Further, although it is preferable to use two barrel members, the joint 10 can be formed using only the single barrel member 35, with the application of finger pressure replacing the pushing of the O-ring 16 off the inner barrel member 35 by the outer barrel member 36.

Turning now to FIG. 6, there is illustrated therein a bullet-shaped plug 70. The plug 70 has a conical or elliptical distal end portion 72, a body portion 74, and a proximal flange portion 76 The plug 70 may also have a longitudinal bore 77 therein which is sized to receive a pin therein.

There is also illustrated in FIG. 6, the O-ring 16 in a position to be fed over the elliptical distal end portion 72 of plug 70 and expanded thereon to a stretched position (shown in phantom) along the body portion 74 of the plug 70.

Once the O-ring 16 is positioned at a somewhat distal location along the length of the body portion 74 of the plug 70, the distal end portion 72 of the plug member 70 is inserted within a lumen 78 (FIGS. 12 and 13) of the inner barrel member 35 of the apparatus 30, as shown in FIG. 7. The outer diameter of the body portion 74 of the plug member 70 is approximately equal to the outer diameter of the inner barrel member 35 and the O-ring 16 can be rolled off of the plug 70 and onto an outer surface 80 of the inner barrel member 35 at the distal end 63 thereof.

Once the plug 70 is inserted within the lumen 78 of the inner barrel member 35, the O-ring 16 is then pushed, such as by the thumb of the user, in a direction shown by the arrow B, over and onto the outer surface 80 of the inner barrel member 35. The plug 70 is removed from its position within the lumen 78 of the inner barrel member 35 as shown in FIG. 8 and set aside.

It is to be understood that the plug 70 is an optional part of the apparatus 30 and can be eliminated. Other more sophisticated means can be used for placing the O-ring 16 on the distal end 63 of the inner barrel member 35 and such placement could even be accomplished manually without the aid of the plug 70.

Next, as illustrated in FIG. 9, an end 82 of the sterile sleeve 14, which is opposite to the end section 18 to be used in formation of the joint 10, having a diameter which is greater than the outer diameter of the outer barrel member 36, is fed over and along the length of the barrel portion 32, until it reaches the bracket 43 which acts as a stop 43 (FIGS. 4 & 5). The remainder of the sleeve 14 continues to be fed over the barrel portion 32 until only the small end section 18 of the sleeve 14, having a predetermined length, remains extending outwardly of the distal end 63 of the inner barrel member 35. This end section 18 of the sleeve 14 eventually forms an inwardly inverted end section 84 of the sleeve 14, as illustrated in FIGS. 10-13.

Turning now to FIG. 10, once the greater length of the sleeve 14 has been fed over the barrel portion 32 of the apparatus 30, a predetermined length of the outwardly extending end section 18 of the sleeve 14 is inverted into the lumen 78 of the inner barrel member 35, as will be described in greater detail in connection with the description of FIGS. 12 and 13. The smaller-in-diameter hub 20 of the connector 12, having the groove 19 therein is then pushed into the lumen 78 of the inner barrel member 35 a predetermined distance, as will be described hereinafter, and frictionally retains the inverted portion 84 of the sleeve 14 within the lumen 78.

In FIG. 12, there is shown a longitudinal sectional view through the distal end of the barrel portion 32.

In order to assure that the end portion 18 of the sleeve 14 is only inverted to a predetermined depth, a depth regulator 86 is provided for positioning within the lumen 78 of the inner barrel member 35. In this respect, if too much of the end portion 18 is inverted, the inverted section 84 may cover or overhang a throughbore (not shown) within the connector 12 and interfere with the flow of materials therethrough. Also, if too little of the end portion 18 of the sleeve 14 is inverted, not enough of the inverted end portion 84 may extend over the connector 12 to form a secure joint 10. Also, to assist in making a determination of the appropriate length of the end 18 to extend outwardly from the distal end 63 of the inner barrel member 35, so that, upon inversion of the end portion 18, the end of the inverted portion 84 rests against the depth regulator 86, the depth regulator 86 is provided with a central locating pin 88 which extends distally outwardly from the distal end 63 of the inner barrel member 35, when the depth regulator 86 is appropriately positioned within the inner barrel member 35. The position of a tip 89 of the locating pin 88 serves as a guide as to the length of the section 18. In this respect, a user aligns the end of the section 18 with the tip 89 of the pin 88 to assure that the end of the inverted portion 84 will rest against the depth regulator 86 when the section 18 is inverted into the lumen 78 of the inner barrel member 35.

Preferably, the disc shaped depth regulator 86 is press fitted into the lumen 78 of the inner barrel member 35 and is fixed in place. For this reason, the plug 70 has the bore 77 for receiving the pin 88.

The inversion of the section 18 may be accomplished by manual methods or by other methods. For example, a vacuum may be applied to a proximal end 90 (FIGS. 4 and 5) of the inner barrel member 35 to pull the section 18 of the sleeve 14 into the lumen 78 of the inner barrel member 35 to form the inverted portion 84 of the sleeve 14. To allow for the vacuum effect to extend through the thickness of the depth regulator 86, the depth regulator 86 is provided with several longitudinal throughbores 92 which are radially disposed about the locating pin 88.

The depth regulator 86 also has a further function with regard to appropriate placement of the hub 20 of the connector 12 within the inner barrel member 35. As shown, once the depth regulator 86 has been appropriately positioned within the lumen 78 of the inner barrel member 35, the hub 20 of the connector 12, having a central throughbore therein, is fed over the locating pin 88 with the locating pin 88 extending into the throughbore of the connector 12 and is pushed into the lumen 78 of the inner barrel member 35 until it abuts against the depth regulator 86. At this abutting position, the groove 19 of the hub 20 is just distal to the distal end 63 of the inner barrel member 35, with the inverted portion 84 of the sleeve 14 being frictionally retained between the hub 20 of the connector 12 and the inner barrel member 35.

The O-ring 16, engaging the outer surface 80 of the inner barrel member 35, now has the inverted portion 84 of the sleeve 14 extending therebeneath with the remainder of the sleeve 14 extending proximally thereover. The distal end 62 of the outer barrel member 36 is shown positioned against the O-ring 16, acting as a stop member for the O-ring 16 on the outer surface 80 of the inner barrel member 35.

Then, as illustrated in FIG. 13, and with reference to the position and actuation of the trigger 34 of the apparatus 30 as illustrated in FIG. 5, when the trigger 34 of the apparatus 30 is actuated, it causes the outer barrel member 36 to move over the inner barrel member 35 to move the O-ring off the distal end 63 of the inner barrel member 35 into the bight 17 of the inverted portion 84 of the sleeve 14 and into the groove 19 of the hub 20. Here, the distal ends 63 and 62 of the inner and outer barrel members 35 and 36, respectively, are shown, with the distal end 62 of the outer barrel member 36, upon actuation of the trigger 34, being pushed distally over and into alignment with the distal end 63 of the inner barrel member 35 to force the O-ring 16 off the outer surface 80 of inner barrel member 35 and into the groove 19 of the connector 12.

Once the formation of the joint 10 has proceeded to this stage, the trigger 34 is released, causing the outer barrel member 36 to retract or move proximally over the inner barrel member 35 and the apparatus 30 is withdrawn from its position within the sleeve 14.

Upon the formation of the joint 10 as described above, various advantages will be observed, the first one being the provision of a smoothened outer surface to the joint 10. Secondly, as described above, a greater pulling action or force will be required to dislodge the O-ring 16 from engagement within the annular groove 19 due to the fact that the O-ring 16 is encased within the bight 17 of the inwardly inverted portion 84 of the sterile sleeve 14.

Also, modifications can be made to the apparatus of the present invention without departing from the teachings thereof.

Accordingly, the scope of the invention is only to be limited as necessitated by the accompanying claims.

I claim:

1. A sterile sleeve/connector assembly for mounting on a medical catheter and comprising: (a) a tubular connector including a hub, (b) a sterile sleeve for protecting the catheter received therein from contaminants thereby to maintain the catheter in a sterile condition, and (c) a joint formed between an end portion of said sterile sleeve and said hub of said connector, said hub comprising a cylindrical end portion having an external annular groove therein, said sterile sleeve being made of a tube of thin flexible material and having an end portion which is received on said hub end portion and which is folded inwardly within the sleeve so as to form an inner sleeve ring within an outer sleeve ring which are connected by a generally toroidally extending bight portion and said joint including an elastic O-ring which is positioned within said bight portion received within said groove and connecting said inner and outer sleeve rings of said inwardly inverted end portion of said sleeve, said O-ring bearing against the bight portion and the inner sleeve ring of said sleeve and within and against the bottom of said groove in said cylindrical end portion of said hub.

2. A sterile sleeve/connector assembly for mounting on a medical catheter and comprising a sterile sleeve for protecting the catheter received therein from contaminants thereby to maintain the catheter in a sterile condition, a connector including a hub, and a joint formed between said hub of said connector and said sterile sleeve, said hub including a cylindrical end portion having an external annular groove therein, said sterile sleeve being made of a tube of thin flexible material and having an end portion which is received on said hub end portion and which is folded inwardly within the sleeve so as to form an inner sleeve ring within an outer sleeve ring which are connected by a generally toroidally extending bight portion, and said joint comprising said annular groove, said end portion of said sterile sleeve and an elastic O-ring received over said inner sleeve ring and said bight portion of said sterile sleeve and in said groove, said joint being assembled using a single barrel member by pushing said O-ring onto an outer surface of the distal end of the barrel member; sliding said sterile sleeve over the barrel member; inverting one end portion of said sleeve into the lumen of the barrel member at the distal end of the barrel member to form said inner and outer sleeve rings; sliding said cylindrical portion of said hub of said connector into the inverted end portion of said sleeve within the lumen at the distal end of the barrel member; forcing said O-ring of the distal end of the barrel member, into said bight portion between said inner and outer sleeve rings of the inverted end portion of said sleeve and into said annular groove in said hub of said connector; and, removing said connector from within the barrel member and pulling of said connector until the entire sleeve is removed from over the barrel member.

* * * * *